(12) United States Patent
Bishop

(10) Patent No.: US 8,408,509 B2
(45) Date of Patent: *Apr. 2, 2013

(54) TELESCOPIC SUPPORT WITH INTERNAL BRAKE

(76) Inventor: William Bishop, Bloomington, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/304,888

(22) Filed: Nov. 28, 2011

(65) Prior Publication Data

US 2012/0080571 A1 Apr. 5, 2012

Related U.S. Application Data

(63) Continuation of application No. 12/457,293, filed on Jun. 5, 2009, now Pat. No. 8,066,246.

(51) Int. Cl.
*A47F 5/00* (2006.01)

(52) U.S. Cl. ...................... 248/354.1; 248/351

(58) Field of Classification Search ............. 248/351, 248/354.1, 354.3, 354.4; 52/146, 149, 153, 52/632, 118; 403/109.8, 109.1, 109.5, 377, 403/FOR. 100

See application file for complete search history.

(56) References Cited

U.S. PATENT DOCUMENTS

| 1,447,519 | A | 3/1923 | Schade |
| 3,506,287 | A | 4/1970 | Lampert |
| 3,555,591 | A | 1/1971 | Sogoian |
| 4,093,042 | A | 6/1978 | Pradon |
| 4,706,916 | A | 11/1987 | Cullmann et al. |
| 5,069,570 | A | 12/1991 | Pryor et al. |
| 5,079,967 | A | 1/1992 | LaCava |
| 5,570,968 | A | 11/1996 | Sassmannshausen et al. |
| 5,609,226 | A | 3/1997 | Penisson |
| 5,636,823 | A | 6/1997 | Boyd |
| 5,683,200 | A | 11/1997 | Levy |
| 6,869,112 | B2 | 3/2005 | Guidetti |
| 7,007,909 | B2 | 3/2006 | Hsieh |
| 7,302,745 | B2 | 12/2007 | Stahle |
| 8,066,246 | B2 * | 11/2011 | Bishop .................. 248/354.1 |
| 2004/0047682 | A1 | 3/2004 | Stahle et al. |

FOREIGN PATENT DOCUMENTS

JP 52036281 3/1977

* cited by examiner

*Primary Examiner* — Alfred J Wujciak
(74) *Attorney, Agent, or Firm* — Richard C. Litman

(57) ABSTRACT

The telescopic support with an internal brake provides a telescoping tube with a selectively actuable and adjustable internal braking mechanism. At least one lower opening is formed through a lower end of a sidewall of an inner hollow tube. A mounting plate is secured within the inner tube adjacent the lower end, and an element is secured to the mounting plate so that the resilient element projects through the lower opening. At least one brake pad is secured to the resilient element, so that the brake pad contacts an inner surface of an outer hollow tube when the internal brake is engaged. At least one cable is provided, with a lower end secured to the brake pad. An actuating mechanism linearly translates the upper end of the cable to selectively disengage the brake pad from the inner surface of the outer hollow tube.

9 Claims, 3 Drawing Sheets

TELESCOPIC SUPPORT WITH INTERNAL BRAKE

CROSS-REFERENCE TO RELATED APPLICATIONS

This is a continuation of my prior application Ser. No. 12/457,293, filed Jun. 5, 2009 now U.S. Pat. No. 8,066,246.

BACKGROUND OF THE INVENTION

1. Field of the Invention

The present invention relates to telescoping tubes and supports, and particularly to a telescoping support with internal brake to selectively and adjustably lock an inner tube with respect to an outer tube.

2. Description of the Related Art

Music stands and the like using telescopic supports in order to provide vertical adjustment are well known in the art. Such stands and supports typically include a releasable locking mechanism, such as a screw or clamp, that allows an inner tube of the telescopic support to be locked in position with respect to an outer tube thereof. Such screws, clamps and similar locking mechanisms, however, are typically awkward and difficult to operate, typically requiring the user to use both of his or her hands in order to release the locking mechanism. Musicians, in particular, often require easy and quick adjustment of their music stands, especially when the musician is handling his or her instrument with at least one of his or her hands. It would be desirable to provide a release and adjustment mechanism for telescopic supports which allows the user to easily and quickly unlock the positioning of the support, preferably with only a single hand.

Thus, a telescopic support with an internal brake solving the aforementioned problems is desired.

SUMMARY OF THE INVENTION

The telescopic support with an internal brake provides a telescoping tube, such as those typically associated with music stands, intravenous bag stands and the like, with a selectively actuable and adjustable internal braking mechanism to selectively and adjustably lock an inner tube with respect to an outer tube. The inner tube has opposed upper and lower ends, the lower end being slidably received within the outer tube. At least one lower opening is formed through a sidewall of the inner tube adjacent the lower end thereof.

A mounting plate is secured within the inner tube adjacent the lower end thereof, and at least one resilient element is secured to the mounting plate such that the at least one resilient element at least partially projects through the at least one lower opening formed through the sidewall of the inner tube. At least one brake pad is secured to the at least one resilient element, so that the at least one brake pad contacts an inner surface of the outer tube when the internal brake is in an engaged state.

At least one cable having opposed upper and lower ends is provided. The lower end of the cable is secured to the at least one brake pad. An actuating mechanism is also provided for linearly translating the upper end of the at least one cable to selectively disengage the at least one brake pad from the inner surface of the outer tube.

At least one bearing is rotatably mounted to the mounting plate. The cable is partially wound about the at least one bearing. A collar is provided, the upper end of the cable being secured to the collar. The actuating mechanism for linearly translating the upper end of the at least one cable preferably includes a fixed base secured within the inner tube adjacent the upper end thereof. A portion of the fixed base projects through an upper opening formed through the inner tube adjacent the upper end thereof. The actuating mechanism further includes a trigger plate slidably mounted within the inner tube adjacent the upper end thereof. A portion of the trigger plate projects through the upper opening. The fixed base and the trigger plate are spaced apart when the internal brake is in the engaged state. In use, the user may squeeze the trigger plate and the fixed base together to cause translation of the at least one cable, compressing the at least one resilient element so that the at least one brake pad disengages from the inner surface of the outer tube.

A passage is formed through the trigger plate. The upper end of the at least one cable passes through the passage. The collar is positioned between the trigger plate and the fixed base when the internal brake is in the engaged state, and a cavity is formed in the fixed base so that the collar is slidably received within the cavity. Even when in the engaged state, an upper portion of the collar is preferably received within the cavity in order to maintain proper alignment between the collar and cavity. The collar is further held in proper alignment with respect to the cavity of the fixed base by the positioning of the fixed base and trigger plate with respect to the upper opening.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
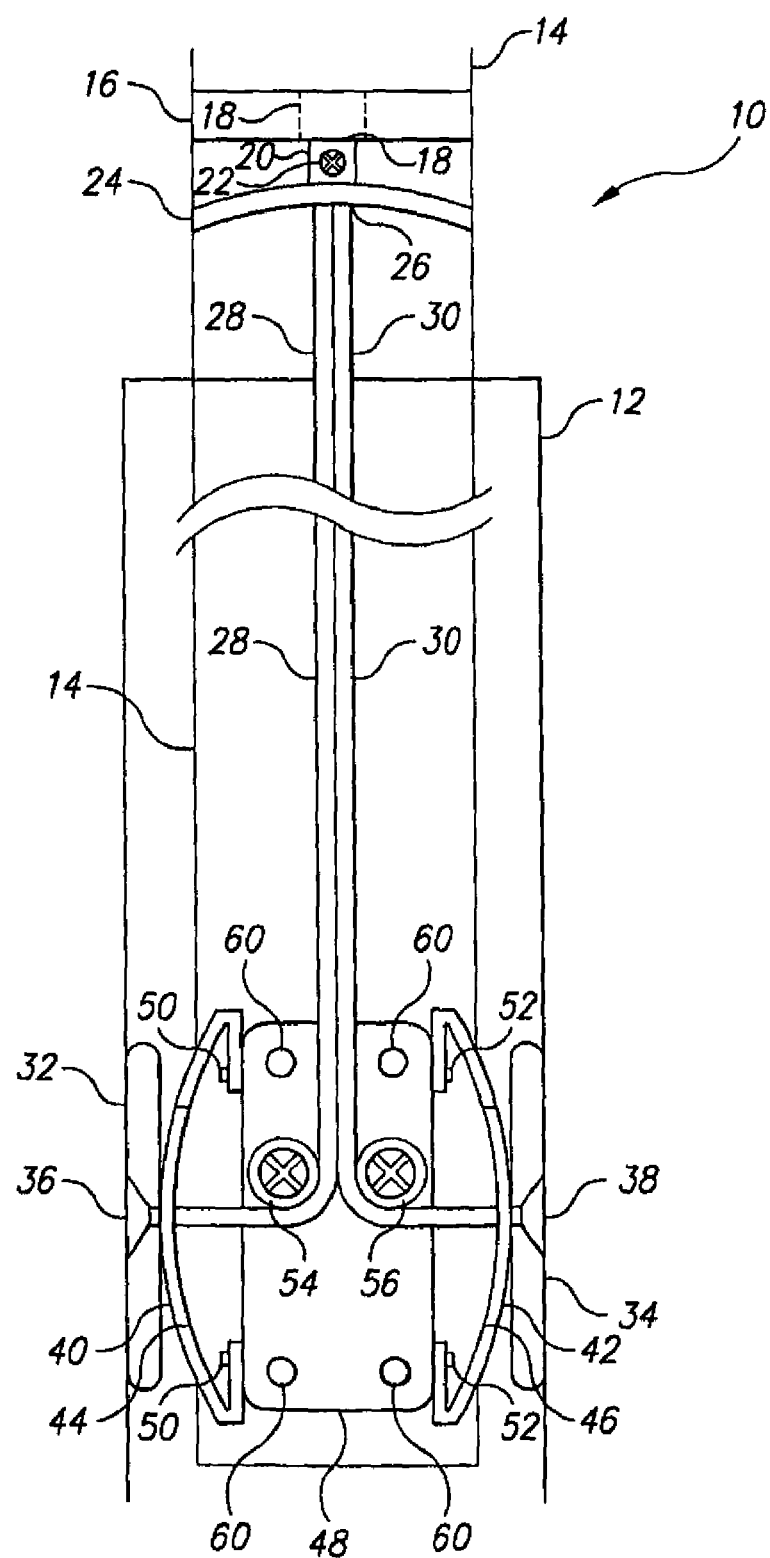
FIG. 1 is a diagrammatic view showing the interior of a telescopic support with an internal brake according to the present invention as seen from the front, with the internal brake being shown in an engaged state.
Figure 2:
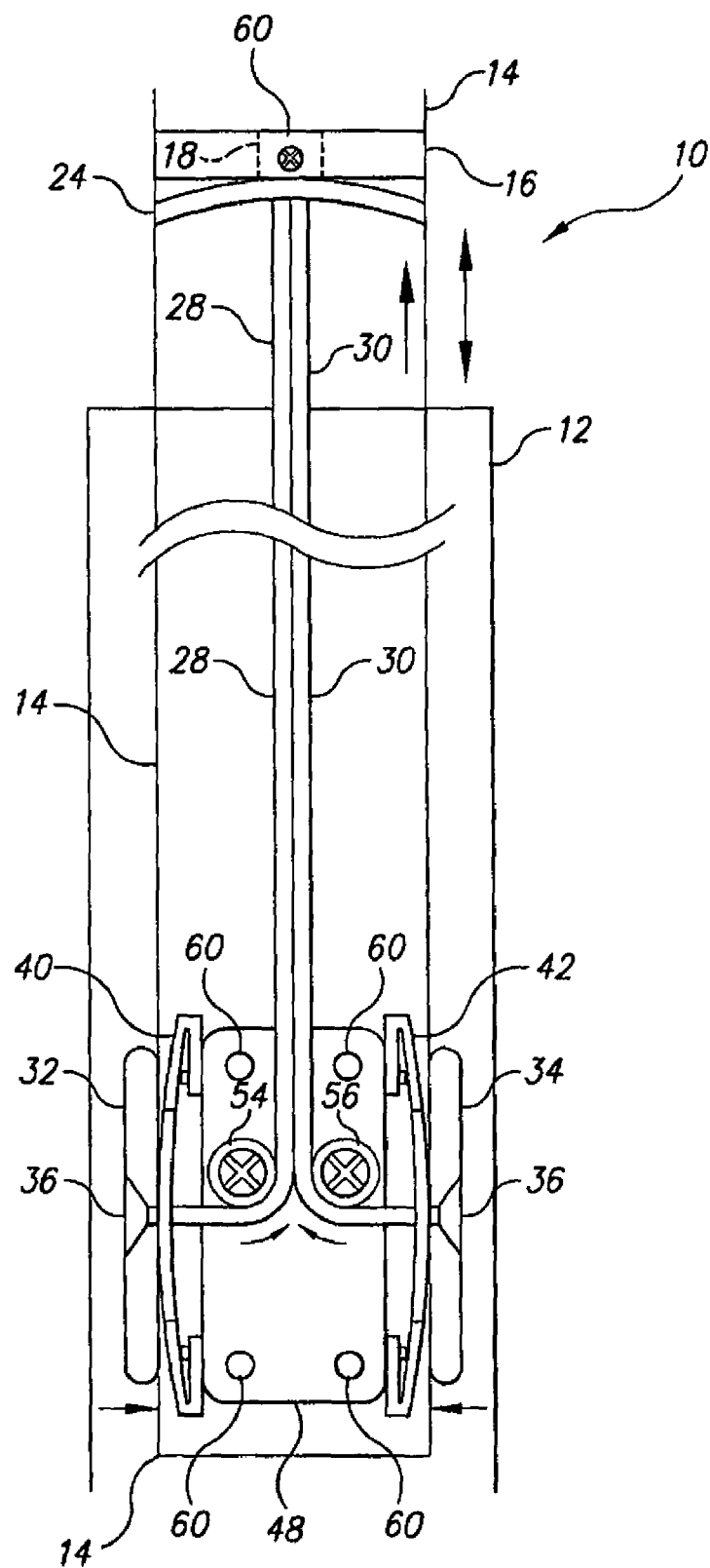
FIG. 2 is a diagrammatic view showing the interior of the telescopic support with an internal brake according to the present invention as seen from the front, with the internal brake being shown in a disengaged state.
Figure 3:
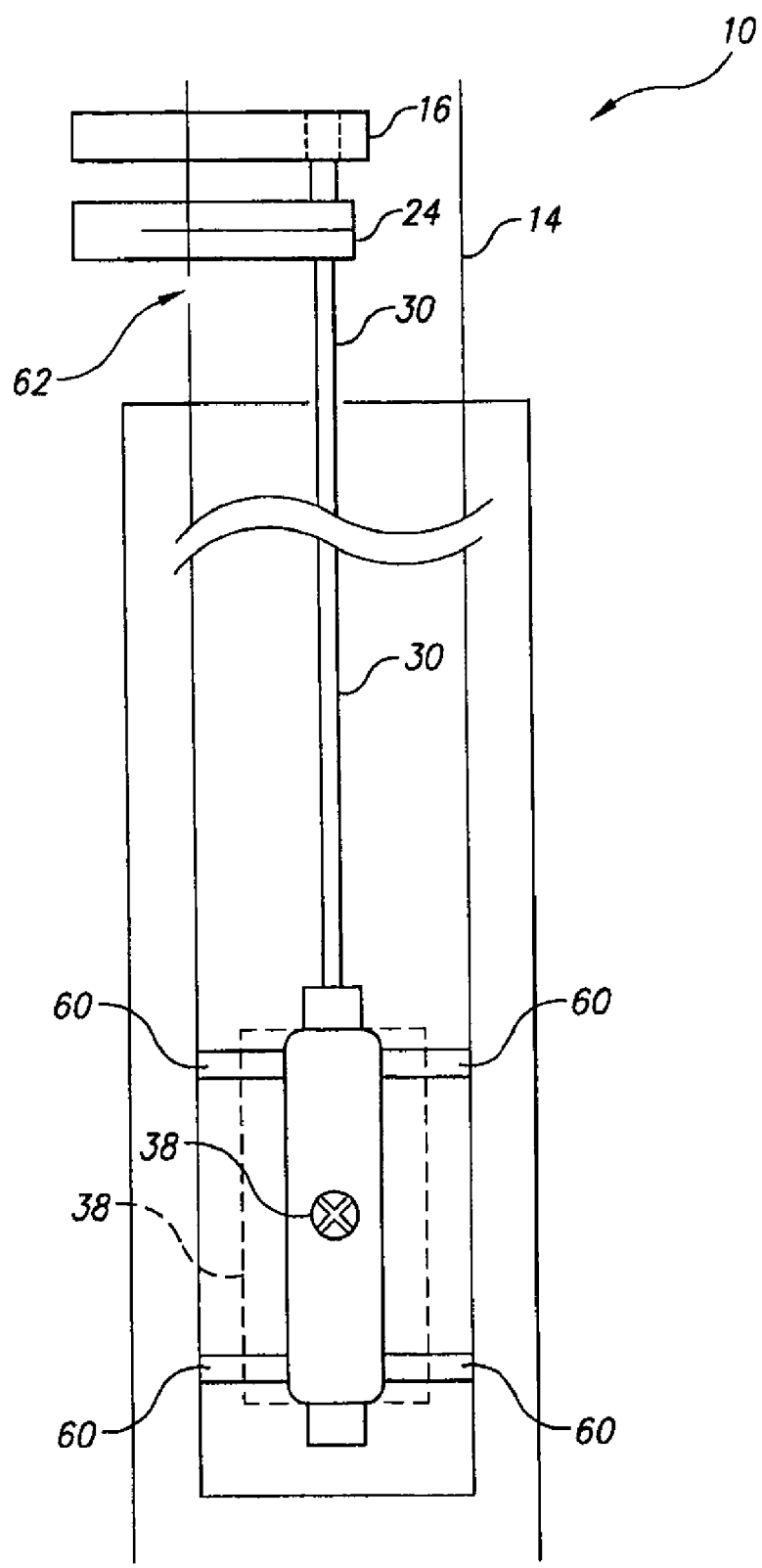
FIG. 3 is a diagrammatic view showing the interior of the telescopic support with an internal brake according to the present invention as seen from the side.

Now referring to FIGS. 1-3, the telescopic support with an internal brake, designated generally as 10 in the drawings, provides a telescoping tube, such as those typically associated with music stands, intravenous bag stands and the like, with a selectively-actuable and adjustable internal braking mechanism to selectively and adjustably lock an inner tube 14 with respect to an outer tube 12. It should be understood that inner tube 14 and outer tube 12 are shown for exemplary purposes only, and that any suitable number of tubes may be utilized to form the telescopic tube 10, and that the relative dimensions of tubes 12, 14 are further shown for exemplary purposes only. Additionally, it should be understood that telescopic tube 10 may be used for any desired application, such as the aforementioned music stands or intravenous bag holders, or for any other application requiring the usage of a telescopic tube. It should further be understood that any desired type of tubes may be used. Though shown in the Figures as being hollow tubes, it should be understood that solid or partially-filled tubes may also be utilized. Further, it should be understood that the braking system may be used with any suitable type of system, rather than only with telescopic tubing. For example, any outer structure having a channel formed therethrough, with an inner sliding core, tube or other structure may replace the outer and inner tubes described herein.

The inner tube 14 has opposed upper and lower ends, with the lower end being slidably received within the outer tube 12, as shown. At least one lower opening is formed through a sidewall of the inner tube 14 adjacent the lower end thereof. Preferably, a pair of openings 44, 46 are formed through the lower end of inner tube 14, with openings 44, 46 being diametrically opposed with respect to one another. It should be understood that inner and outer tubes 14, 12, respectively, may have any desired contouring, such as being substantially cylindrical or having a square cross-sectional contour, for example, and may have any desired dimensions.

A mounting plate 48 is secured within the inner tube 14 adjacent the lower end thereof. As best shown in FIG. 3, a plurality of rods 60 are provided to secure the mounting plate 48 within inner hollow tube 14, although it should be understood that any suitable type of attachment may be utilized to fixedly secure the mounting plate 48 adjacent the lower end of inner tube 14, between the openings 44, 46. It should be understood that mounting plate 48 is shown for exemplary purposes only, and may have any desired contouring, dimensions or configuration. As an alternative, mounting plate 48 may be removed, and resilient elements 40, 42, bearings 54, 46 and brake pads 32, 34 (all to be described in greater detail below) may be held by any suitable type of attachment or mounting.

At least one resilient element is secured to the mounting plate 48, as shown. Preferably, a pair of resilient elements 40, 42 are provided, such that the resilient elements 40, 42 each at least partially projects through a respective one of lower openings 44, 46 formed through the sidewall of the inner tube 14. Although shown as being leaf springs, it should be understood that any suitable type of resilient elements may be utilized. Leaf springs 40, 42 are shown being secured to mounting plate 48 by pairs of pins 50, 52, respectively, though it should be understood that any suitable type of attachment or mounting may be utilized. Additionally, any suitable number of resilient elements may be utilized.

Further, at least one brake pad is secured to the at least one resilient element. Preferably, a pair of brake pads 32, 34 are provided, as shown, respectively secured to leaf springs 40, 42. Any suitable type of brake pad or frictional element may be utilized, and it should be understood that brake pads 32, 34 are shown for exemplary purposes only. Brake pads 32, 34 are secured to resilient elements 40, 42 such that the brake pads 32, 34 contact an inner surface of the outer tube 12 when the internal brake is in the engaged state.

At least one cable, having opposed upper and lower ends, is further provided, with the lower end thereof being secured to the at least one brake pad. As shown, first and second cables 28, 30 are preferably provided, with the upper ends thereof being secured to a collar 20 by a set screw 22, or by any other suitable fixture, and with the lower end of first cable 28 being secured to brake pad 32 by a screw 36 or the like, and with the lower end of the second cable 30 being secured to brake pad 34 by a similar screw 38 or the like. Preferably, as shown, brake pads 32, 34 are positioned diametrically opposite one another, with respect to inner hollow tube 14 and outer tube 12. Further, a pair of bearings 54, 56, or any other suitable rotating elements, such as rotating pins, are rotatably mounted to the mounting plate 48, with the first and second cables 28, 30 each partially winding about a respective one of bearings 54, 56, as shown.

An actuating mechanism is provided for linearly translating the upper ends of the cables 28, 30 to selectively disengage the brake pads 32, 34 from the inner surface of the outer tube 12. The actuating mechanism preferably includes a fixed base 16 secured within the inner tube 14 adjacent the upper end thereof, with a portion of the fixed base 16 projecting through an upper opening 62 (best seen in FIG. 3) formed through the inner hollow tube 14 adjacent the upper end thereof. The actuating mechanism further includes a trigger plate 24 slidably mounted within the inner tube 14 adjacent the upper end thereof, with a portion of the trigger plate 24 also projecting through the upper opening 62, as shown.

As shown in FIG. 1, the fixed base 16 and the trigger plate 24 are spaced apart when the internal brake is in the engaged state. In use, as shown in FIG. 2, the user may squeeze the trigger plate 24 and the fixed base 16 together to cause translation of cables 28, 30, thus compressing the resilient elements 40, 42 and causing brake pads 32, 34 to disengage from the inner surface of the outer tube 12. In the disengaged state of FIG. 2, the user may then adjust the position of inner hollow tube 14 with respect to outer tube 12. When the desired positioning is achieved, the user may release the trigger plate 24 and, due to the resilient biasing of resilient elements 40, 42, the brake pads 32, 34 re-engage the inner surface of the outer tube 12, thus locking the inner tube 14 in place with respect thereto. As an alternative, the upper portions of cables 28, 30 may be replaced by a rod or the like, with the upper end of rod being secured to trigger plate 24, and the cables being secured to the lower end of the rod.

As shown, a passage 26 is preferably formed through the trigger plate 24, with the upper ends of cables 28, 30 passing through the passage 26 and being joined together by collar 20. The collar 20 is positioned between the trigger plate 24 and the fixed base 16 when the internal brake is in the engaged state (as shown in FIG. 1), and a cavity 18 is formed in the fixed base 16 such that the collar 20 is slidably received within the cavity 18 (as shown in FIG. 2). Even when in the engaged state, an upper portion of the collar 20 is preferably received within the cavity 18 in order to maintain proper alignment between the collar 20 and cavity 18. The collar 20 is further held in proper alignment with respect to the cavity 18 of the fixed base by the positioning of the fixed base 16 and trigger plate 24 with respect to the upper opening 62. Additionally, a seal may be provided to at least partially cover upper opening 62 in order to prevent moisture from entering the interior of inner tube 14. It should be understood that trigger plate 24 and fixed base 16 are shown for exemplary purposes only, and that any desired type of actuating mechanism, allowing the user to selectively linearly translate cables 28, 30 to disengage brake pads 32, 34 may be utilized. Alternatively, it should be understood that collar 20 may be fully displaced from within cavity 18 when in the engaged state, and any suitable mechanism, contouring or additional elements may be utilized to maintain alignment between collar 20 and cavity 18, dependent upon the particular needs and desires of the user.

It is to be understood that the present invention is not limited to the embodiments described above, but encompasses any and all embodiments within the scope of the following claims.

I claim:
1. A telescopic support with an internal brake, comprising:
an outer tube;
an inner tube having opposed upper and lower ends, the lower end being slidably received within the outer tube, at least one lower opening being formed through a sidewall of the inner tube adjacent the lower end thereof;

a mounting plate secured within the inner tube adjacent the lower end thereof;

at least one resilient element secured to said mounting plate, the at least one resilient element at least partially projecting through the at least one lower opening formed through the sidewall of the inner tube;

at least one brake pad secured to the at least one resilient element, the at least one brake pad contacting an inner surface of the outer tube when the internal brake is in an engaged state;

at least one cable having opposed upper and lower ends, the upper end thereof being secured to the at least one brake pad; and means for linearly translating the upper end of the at least one cable to selectively disengage the at least one brake pad from the inner surface of the outer tube, wherein said means for linearly translating the upper end of the at least one cable comprises:
  i) a fixed base secured to the outer tube adjacent the upper end thereof, a portion of the fixed base projecting through an upper opening formed through the outer tube adjacent the upper end thereof; and
  ii) a trigger plate slidably mounted within the outer tube adjacent the upper end thereof, a portion of the trigger plate projecting through the upper opening.

2. The telescopic support with an internal brake as recited in claim 1, further comprising at least one bearing rotatably mounted to said mounting plate, the at least one cable partially winding about the at least one bearing.

3. The telescopic support with an internal brake as recited in claim 1, further comprising a collar, the upper end of the at least one cable being secured to the collar.

4. The telescopic support with an internal brake as recited in claim 1, wherein a passage is formed through said trigger plate, the upper end of the at least one cable passing through the passage, the collar being positioned between said trigger plate and said fixed base when the internal brake is in the engaged state, a cavity being formed in the fixed bse, the collar being slidably received within the cavity.

5. The telescopic support with an internal brake as recited in claim 4, wherein an upper portion of the collar is received within the cavity when the internal brake is the engaged state.

6. The telescopic support with an internal brake as recited in claim 5, wherein the at least one cable comprises first and second cables, upper ends of the first and second cables being respectively secured to the collar.

7. The telescopic support with an internal brake as recited in claim 6, wherein first and second lower openings are formed through the inner tube, the at least one resilient element comprising first and second resilient elements, the at least one brake pad comprising first and second brake pads, the lower ends of the first and second cables being respectively secured to the first and second brake pads.

8. The telescopic support with an internal brake as recited in claim 7, wherein the at least one bearing comprises first and second bearings, the first cable being partially wound about the first bearing and the second cable being partially wound about the second bearing.

9. The telescopic support with an internal brake as recited in claim 8, wherein the first and second brake pads are diametrically opposed from one another with respect to the outer and inner tubes.

* * * * *